M. J. WIGHTMAN.
SYSTEM OF ELECTRIC PROPULSION.
APPLICATION FILED JAN. 8, 1916.
1,208,429.
Patented Dec. 12, 1916.
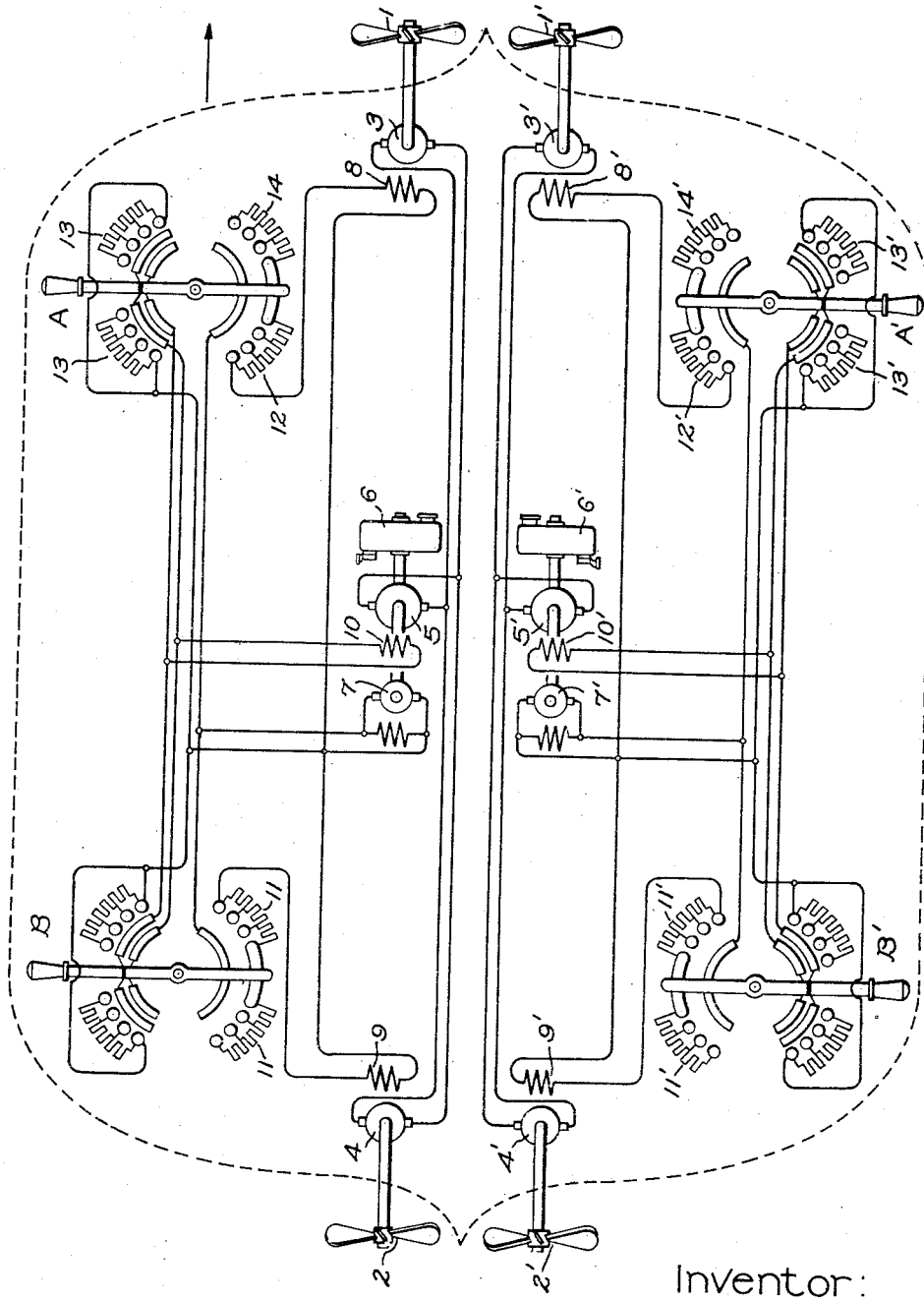
Inventor:
Merle J. Wightman,
by
His Attorney.

UNITED STATES PATENT OFFICE.

MERLE J. WIGHTMAN, OF SEATTLE, WASHINGTON, ASSIGNOR TO GENERAL ELECTRIC COMPANY, A CORPORATION OF NEW YORK.

SYSTEM OF ELECTRIC PROPULSION.

1,208,429.  Specification of Letters Patent.  Patented Dec. 12, 1916.

Application filed January 8, 1916.  Serial No. 70,982.

*To all whom it may concern:*

Be it known that I, MERLE J. WIGHTMAN, a citizen of the United States, residing at Seattle, in the county of King, State of Washington, have invented certain new and useful Improvements in Systems of Electric Propulsion, of which the following is a specification.

My present invention relates to a system of electric propulsion for vessels and more especially for vessels such as ferry boats which are provided with propellers at both ends and are adapted to be propelled with equal efficiency in either direction.

It has been found that the best efficiency of propulsion in vessels of this type is obtained when the forward propellers are driven at a speed which is about two-thirds that of the rear propellers.

The object of my invention is to provide a control system for an electrically propelled vessel of the above description in which means is included for driving the front propellers at a slower speed than the rear propellers when the vessel is going in either direction.

A further object of my invention is to provide such a system in which the ratio between the speeds of the two propellers will vary in proportion to the speeds of the propellers.

My invention will best be understood by reference to the following description taken in connection with the accompanying drawing in which I have illustrated diagrammatically one way in which my invention may be carried into effect.

As shown in the drawing the propulsion means include propellers 1 and 1' at one end of the boat and 2 and 2' at the opposite end. These propellers are driven by individual motors 3, 3', 4 and 4'. Motors 3 and 4 are supplied with current by generator 5, and motors 3' and 4' are supplied by generator 5'. Since the control system for motors 3' and 4' is a duplicate of the one provided for motors 3 and 4 I will describe in detail the latter system only. The control system preferably used is one in which the desired speed variation of the propeller motors is obtained by varying the electromotive force at the terminals of the motors by varying the strength of the generator field. Generator 5 is driven by a prime mover 6 and an exciter 7 for exciting the fields of the generator and motors may be connected to the same shaft as indicated, or may be separately driven if desired. The armature of generator 5 is connected directly to the armatures of motors 3 and 4, and the fields 8 and 9 of the motors are connected to the exciter 7 through controllers A and B which also serve to vary the voltage applied to the field 10 of the generator 5.

The operation of my improved system is as follows: Assume that the boat is to be propelled in the direction of the arrow or to the right. Its movement will be governed by controller A which may conveniently be located in the pilot house. Controller B will be in the off position in which the resistance 11 is connected in series with the motor field 9. When the handle of controller A is moved to the right to start the motors in the desired direction and cut out the resistance 13 in the generator field, the resistance 12 is gradually cut out of the circuit of motor field 8 so that the field of this motor is strengthened and its speed does not increase as fast as motor 4, the field strength of which remains constant. In other words the propeller 1 which is a forward propeller will not be driven as fast as rear propeller 2. The ratio between the speeds of the two may be adjusted to the desired value by properly proportioning the resistances 11 and 12, and by progressively cutting out the resistance 12 as the speed of the vessel is increased the ratio between the two speeds may be varied in proportion to the speeds of the motors. If it is desired that the ratio between the two speeds be kept substantially constant all of the resistance 12 may be cut out at one step. In case it is desired to reverse the vessel the controller A may be thrown to the left to reverse the generator field and thus reverse the direction of rotation of the motors. While this is being done resistance 14 is being gradually cut into motor field 8 and its strength reduced so that motor 3 which is now the rear motor will run at a higher speed than motor 4 which is now a forward motor. Controllers A and A' and B and B' may be interlocked so that both sets of motors may be controlled in the same manner by moving one controller only. In case it is desired to be able to steer the boat by means of the propellers the controllers may be so arranged that they may be operated separately or together as desired.

In case the vessel is to travel in a direction opposite to that in which the arrow points controller B may be used and the operation will be the same as that described above except that propeller 2 will be a forward propeller and the resistance 11 will be cut out of motor field 9 while resistance 12 will remain in motor field 8. In case it is desired to use a single controller for each set of motors the resistances for both motors may be connected to one controller and so arranged that when going in one direction the resistance is cut out of one motor field and when going in the opposite direction resistance is cut out of the other motor field.

While I have described only one embodiment of my invention, I do not wish to be limited to the particular form shown and described as it will be apparent that many modifications therein may be made without departing from the scope of my invention as set forth in the appended claims.

What I claim as new and desire to secure by Letters Patent of the United States, is:—

1. The combination in a system of electric propulsion of a vessel, propellers for said vessel located at the opposite ends thereof, an independent motor for driving each propeller, and a controlling device near each end of the vessel for simultaneously controlling the motors at both ends and for maintaining a lower speed of the motor driving the propeller at one end of said boat than that of the motor driving the propeller at the other end.

2. The combination in a system of electric propulsion of a vessel adapted to be driven in either direction, propellers for said vessel located at the opposite ends thereof, an independent motor for driving each propeller, means for maintaining a lower speed of the motor driving the propeller at one end of said boat than that of the motor driving the propeller at the other end, and means for regulating the relative speeds of said motors in accordance with the direction in which said vessel is driven.

3. The combination in a system of electric propulsion of a vessel, propellers for said vessel located at the opposite ends thereof, an independent motor for driving each propeller, means for driving said motors at different speeds, and means for varying the ratio between the speeds of said motors in proportion to the speeds of the motors.

4. The combination in a system of electric propulsion of a vessel adapted to be driven in either direction, propellers for said vessel located at the opposite ends thereof, an independent motor for driving each propeller, means for driving said motors at different speeds and means for regulating the relative speeds of said motors in accordance with the direction in which said vessel is driven.

5. The combination in a system of electric propulsion of a vessel, two propellers for said vessel at each end thereof, an independent motor for driving each propeller, a generator for supplying current to one motor at each end of the vessel, a second generator for supplying current to the second motor at each end of the vessel, and controlling means at each end of the vessel for maintaining a lower speed of the motors driving the propellers at one end of the vessel than that of the motors driving the propellers at the other end of the vessel.

6. The combination in a system of electric propulsion of a vessel adapted to be driven in either direction, two propellers for said vessel at each end thereof, an independent motor for driving each propeller, a generator for supplying current to one motor at each end of the vessel, a second generator for supplying current to the second motor at each end of the vessel, controlling means at each end of the vessel for maintaining a lower speed of the motors driving the propellers at one end of the vessel than that of the motors driving the propellers at the other end of the vessel, and means for regulating the relative speeds of said motors in accordance with the direction in which said vessel is driven.

7. The combination in a system of electric propulsion of a vessel, two propellers for said vessel at each end thereof, an independent motor for driving each propeller, a generator for supplying current to one motor at each end of the vessel, a second generator for supplying current to the second motor at each end of the vessel, means for driving the motors at opposite ends of the vessel at different speeds, and means for varying the ratio between the speeds of said motors in proportion to the speeds of the motors.

8. The combination in a system of electric propulsion of a vessel adapted to be driven in either direction, two propellers for said vessel at each end thereof, an independent motor for driving each propeller, a generator for supplying current to one motor at each end of the vessel, a second generator for supplying current to the second motor at each end of the vessel, means for driving the motors at opposite ends of the vessel at different speeds, and means for regulating the relative speeds of said motors in accordance with the direction in which said vessel is driven.

9. The combination in a system of electric propulsion of a vessel, propellers for said vessel located at the opposite ends thereof, an independent motor for driving each propeller, resistances in the field circuit of each of said motors and means for varying the resistance in the field of one of the motors without varying the resistance in the field of the other motor whereby one of the motors will be driven at a lower speed than that of the other motor.

10. The combination in a system of electric propulsion of a vessel adapted to be driven in either direction, propellers for said vessel located at the opposite ends thereof, an independent motor for driving each propeller, resistances in the fields of said motors, means for varying the resistance in the field of one of the motors without varying the resistance in the field of the other motor whereby one of the motors will be driven at a lower speed than the other motor, said resistance varying means being so arranged that the relative speeds of said motors may be regulated in accordance with the direction in which said vessel is driven.

11. The combination in a system of electric propulsion of a vessel, two propellers for said vessel at each end thereof, an independent motor for driving each propeller, a generator for supplying current to one motor at each end of the vessel, a second generator for supplying current to the second motor at each end of the vessel, resistances in the fields of said motors and controlling means at each end of the vessel for varying the resistances in the fields of the motors at each end of the vessel without varying the resistances in the fields of the motors at the opposite end of the vessel whereby the motors at one end of the vessel will be maintained at a lower rate of speed than that of the motors driving the propellers at the other end of the vessel.

12. The combination in a system of electric propulsion of a vessel adapted to be driven in either direction, two propellers for said vessel at each end thereof, an independent motor for driving each propeller, a generator for supplying current to one motor at each end of the vessel, a second generator for supplying current to the second motor at each end of the vessel, resistances for the fields of said motor, means at each end of the vessel for varying the resistances in the fields of the motors at one end of the vessel without varying the resistance of the fields of the motors at the other end of the vessel whereby the motors at opposite ends of the vessel will be driven at different speeds, said resistance varying means being so arranged that the relative speeds of said motors may be regulated in accordance with the direction in which said vessel is driven and the resistances being so proportioned that the ratio between the speeds of said motors may be varied in proportion to the speeds of the motors.

In witness whereof, I have hereunto set my hand this 27th day of December, 1915.

MERLE J. WIGHTMAN.